United States Patent
Panamarathupalayam et al.

(10) Patent No.: US 10,012,057 B2
(45) Date of Patent: Jul. 3, 2018

(54) METHODS OF USING OLEAGINOUS FLUIDS FOR COMPLETION OPERATIONS

(75) Inventors: Balakrishnan Panamarathupalayam, Houston, TX (US); Hui Joyce Zhang, Sugar Land, TX (US); Balkrishna Gadiyar, Katy, TX (US); William E. Foxenberg, Pearland, TX (US); Charles Svoboda, Katy, TX (US); Alhad Phatak, Stafford, TX (US)

(73) Assignee: M-I L.L.C., Houston, TX (US)

( * ) Notice: Subject to any disclaimer, the term of this patent is extended or adjusted under 35 U.S.C. 154(b) by 602 days.

(21) Appl. No.: 14/344,299

(22) PCT Filed: Sep. 14, 2012

(86) PCT No.: PCT/US2012/055533
§ 371 (c)(1),
(2), (4) Date: Oct. 15, 2014

(87) PCT Pub. No.: WO2013/040427
PCT Pub. Date: Mar. 21, 2013

(65) Prior Publication Data
US 2015/0027701 A1     Jan. 29, 2015

Related U.S. Application Data

(60) Provisional application No. 61/635,933, filed on Apr. 20, 2012, provisional application No. 61/535,312, filed on Sep. 15, 2011.

(51) Int. Cl.
*E21B 43/04* (2006.01)
*C09K 8/36* (2006.01)
*E21B 43/08* (2006.01)

(52) U.S. Cl.
CPC ............ *E21B 43/04* (2013.01); *C09K 8/36* (2013.01); *E21B 43/08* (2013.01)

(58) Field of Classification Search
CPC ................................ E21B 43/04; C09K 8/36
See application file for complete search history.

(56) References Cited

U.S. PATENT DOCUMENTS

| 5,504,062 A | 4/1996 | Johnson |
| 6,562,764 B1 | 5/2003 | Donaldson et al. |

(Continued)

FOREIGN PATENT DOCUMENTS

| WO | 2009006326 A2 | 1/2009 |
| WO | 2010018205 A1 | 2/2010 |

(Continued)

OTHER PUBLICATIONS

Ali, et al., "Synthetic drill-in fluid for gravel packing depleted sands and pressured shale", Petroleum Engineer International, vol. 72, No. 3, Mar. 1, 1999, pp. 31-36.

(Continued)

*Primary Examiner* — Catherine A Loikith
(74) *Attorney, Agent, or Firm* — David J. Smith

(57) ABSTRACT

In a method of gravel packing a wellbore in a subterranean formation, the wellbore having a cased section and an uncased section, the method may include pumping into the wellbore a gravel pack composition having gravel and a carrier fluid, where the carrier fluid includes an oleaginous fluid and an inorganic solid aggregator material.

37 Claims, 3 Drawing Sheets

(56) References Cited

U.S. PATENT DOCUMENTS

| | | | |
|---|---|---|---|
| 6,883,608 B2 | 4/2005 | Parlar et al. | |
| 7,373,978 B2 | 5/2008 | Barry et al. | |
| 7,740,068 B2 * | 6/2010 | Ballard | C09K 8/032 106/633 |
| 7,803,743 B2 | 9/2010 | Jones et al. | |
| 8,168,569 B2 | 5/2012 | Ballard et al. | |
| 2007/0131425 A1 | 6/2007 | Gatlin et al. | |
| 2008/0041589 A1 * | 2/2008 | Oakley | C09K 8/03 166/278 |
| 2008/0064613 A1 | 3/2008 | Massam | |
| 2009/0025932 A1 | 1/2009 | Panga et al. | |
| 2009/0111718 A1 | 4/2009 | Gadiyar et al. | |
| 2010/0009874 A1 | 1/2010 | Ballard et al. | |
| 2010/0018709 A1 | 1/2010 | Parlar et al. | |
| 2010/0096130 A1 | 4/2010 | Parlar et al. | |
| 2010/0212896 A1 * | 8/2010 | Navarro | C09K 8/26 166/278 |
| 2010/0286000 A1 | 11/2010 | Huang et al. | |
| 2010/0319919 A1 | 12/2010 | Bustos et al. | |
| 2011/0186293 A1 | 8/2011 | Gurmen et al. | |

FOREIGN PATENT DOCUMENTS

| | | |
|---|---|---|
| WO | 2010020955 A1 | 2/2010 |
| WO | 2010126925 A2 | 11/2010 |
| WO | 2011036411 A1 | 3/2011 |
| WO | 2011129937 A2 | 10/2011 |
| WO | 2012129406 A1 | 9/2012 |

OTHER PUBLICATIONS

American Petroleum Institute, "Recommended Practice Standard Procedure for Field Testing Oil-Based Drilling Fluids", API RP 13B2, Feb. 1, 1998, 77 pages.

Examination Report issued in AU2012308318 dated Jul. 23, 2014, 8 pages.

Requisition Official Action issued in CA2848408 dated Apr. 7, 2015, 10 pages.

Ezzat, et al., "Solids-Free Brine-in-Oil Emulsions for Well Completion", SPE 17161—SPE Drilling Engineering, vol. 4, No. 4, 1989, pp. 300-306.

Hecker, et al., "Reducing Well Cost by Gravel Packing in Nonaqueous Fluid", SPE 90758—SPE Annual Technical Conference and Exhibition, Houston, Texas, Sep. 26-29, 2004, 7 pages.

Jones, et al., "Gravel Packing with OBM Carrier Fluids in Remote Locations—Accepting the Challenges, Overcoming the Odds", AADE-10-DF-HO-07, 2010, 6 pages.

Parlar, et al., "Gravel Packing Wells Drilled With Oil-Based Fluids: A Critical Review of Current Practices and Recommendations for Future Applications", SPE 89815—SPE Annual Technical Conference and Exhibition, Houston, Texas, Sep. 26-29, 2004, 15 pages.

International Search Report and Written Opinion issued in PCT/US2012/055533 dated Feb. 27, 2013, 6 pages.

Powers, et al., "A Critical Review of Chirag Field Completions Performance—Offshore Azerbaijan", SPE—98146 International Symposium and Exhibition on Formation Damage Control, Lafayette, Louisiana, Feb. 15-17, 2006, 13 pages.

Whaley, et al., "Greater Plutonio Open Hole Gravel Pack Completions: Fluid Design and Field Application", SPE—107297 European Formation Damage Conference, Scheveningen, The Netherlands, May 30-Jun. 1, 2007,18 pages.

Wagner, et al., "Open-hole horizontal drilling and gravel-packing with oil-based fluids—an industry milestone", SPE 87648, Jan. 1, 2014, pp. 1-16, XP55202287.

Extended European Search Report issued in EU application 12832463.9 dated Jul. 23, 2015, 7 pages.

Office Action issued in Canadian Patent Application No. 2,848,408; dated Mar. 3, 2016 (3 pages).

Office Action issued in Eurasian Patent Application No. 201490633; dated May 16, 2016 (2 pages).

* cited by examiner

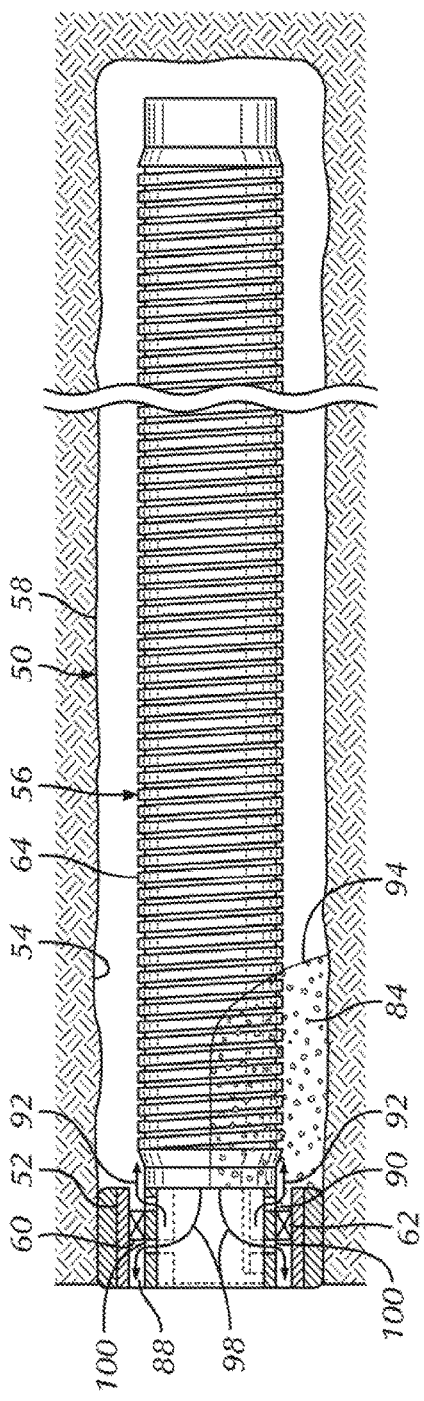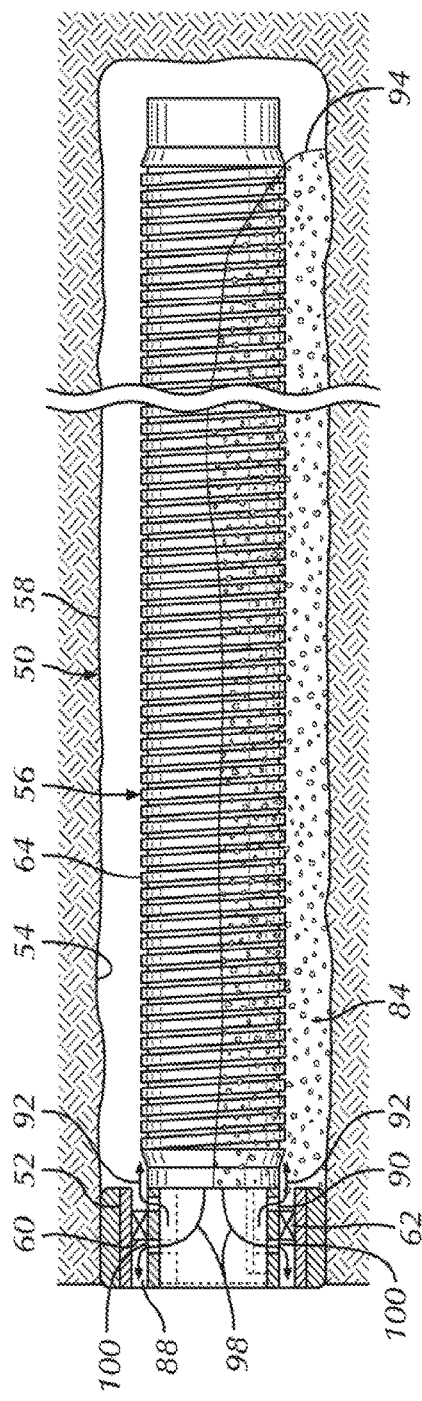

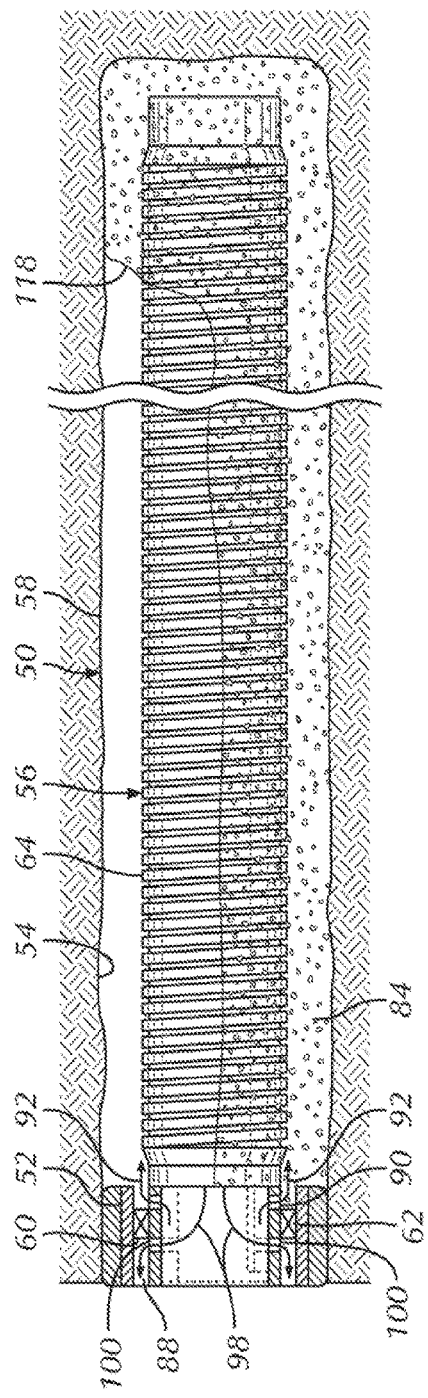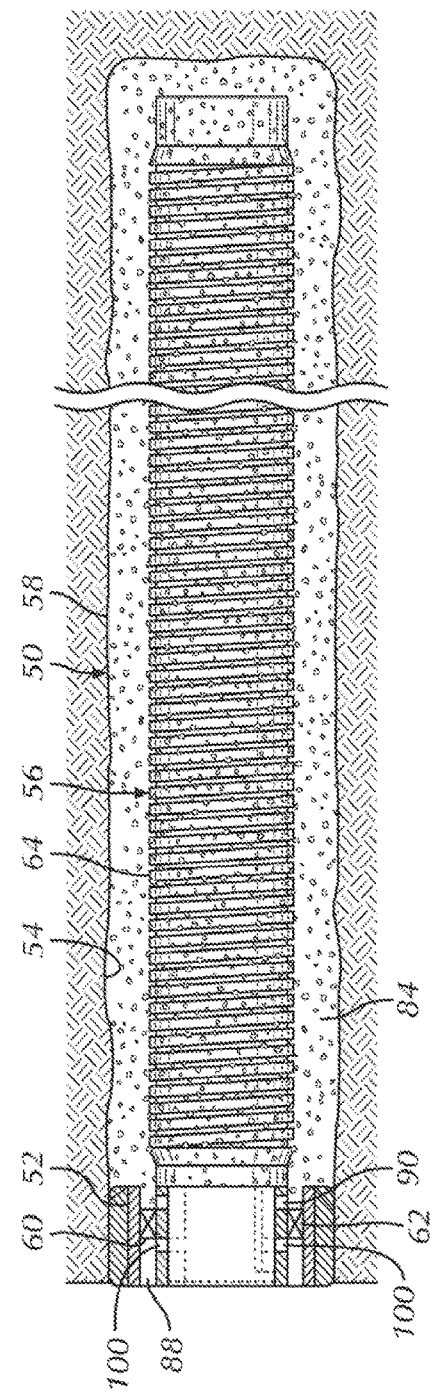
FIG. 1C
FIG. 1D

METHODS OF USING OLEAGINOUS FLUIDS FOR COMPLETION OPERATIONS

BACKGROUND

Field of the Disclosure

Embodiments disclosed herein relate generally to wellbore fluids for completion operations. In particular, embodiments disclosed herein relate to oleaginous fluids for use in gravel packing.

Background

During the drilling of a wellbore, various fluids are typically used in the well for a variety of functions. The fluids may be circulated through a drill pipe and drill bit into the wellbore, and then may subsequently flow upward through wellbore to the surface. During this circulation, the drilling fluid may act to remove drill cuttings from the bottom of the hole to the surface, to suspend cuttings and weighting material when circulation is interrupted, to control subsurface pressures, to maintain the integrity of the wellbore until the well section is cased and cemented, to isolate the fluids from the formation by providing sufficient hydrostatic pressure to prevent the ingress of formation fluids into the wellbore, to cool and lubricate the drill string and bit, and/or to maximize penetration rate.

In most rotary drilling procedures the drilling fluid takes the form of a "mud," i.e., a liquid having solids suspended therein. The solids function to impart desired rheological properties to the drilling fluid and also to increase the density thereof in order to provide a suitable hydrostatic pressure at the bottom of the well. The drilling mud may be either a water-based or an oil-based mud.

Many wells, especially in oil fields in shale formations (having water sensitivity) and/or deep-water/subsea environments, are drilled with synthetic/oil-based muds or drilling fluids. Because of the extremely high cost of intervention and high production rates, these wells require reliable completion techniques that prevent sand production and maximizes productivity throughout the entire life of the well. One such technique is open-hole gravel packing.

In unconsolidated formations, sand control measures are implemented to stabilize formation sand. Common practice for controlling sand displacement includes placement of a gravel pack to hold formation sand in place. The gravel pack is typically deposited around a screen. The gravel pack filters the sand while still allowing formation fluid to flow through the gravel, the screen and a production pipe.

There are two principal techniques used for gravel packing open holes: (1) the alternate path technique and (2) alpha-beta packing technique. The latter uses low-viscosity fluids, such as completion brines to carry the gravel from the surface and deposit it into the annulus between a sand-control screen and the wellbore. The alternate path technique, on the other hand, utilizes viscous carrier fluids; therefore the packing mechanisms of these two techniques are significantly different. The alternate path technique allows bypassing of any bridges that may form in the annulus, caused by for example high leakoff into the formation due to filtercake erosion, or exceeding the fracturing pressure, or shale-sloughing/shale-swelling or localized formation collapse on the sand control screens.

Most of the recently discovered deep-water fields contain a high fraction of shales, which are water-sensitive, although many have been gravel packed with water-based fluids. A very large fraction of them have been completed with viscous fluids using the alternate path technique. Viscoelastic surfactant (VES) solutions have been the most widely used carrier fluid in open hole gravel packing with the alternate path technique due to their low formation and gravel pack damage characteristics, their low drawdown requirements, their capability of incorporating filtercake cleanup chemicals into the carrier fluid, and their low friction pressures.

In wells drilled with synthetic or oil-based muds (often the case for high shale fractions and/or deep water wells), three main approaches have been used for gravel packing. A first approach involves displacement of the entire wellbore to water-based fluids at the end of drilling the reservoir section, and subsequently running the sand control screens into the open hole, setting the packer and gravel packing with a water based fluid. However, as experienced by several operators, the problem with this approach is that exposure of reactive shales to water-based fluids for prolonged time periods can cause shale collapse or swelling which effectively reduces the wellbore diameter and makes it impossible to install sand control screens to the target depth (see SPE 89815, SPE 90758) or shale dispersion into the carrier fluid during gravel packing which can have a significant impact on well productivity (Ali et al.—Petroleum Engineer International, March 1999). The success of this approach is therefore heavily dependent on the reactivity of the shales.

One approach subsequently practiced involved installation of a pre-drilled (perforated) liner in oil-based mud, then displacement of the entire wellbore to water based fluids, subsequent installation of the sand control screens to target depth and finally gravel packing with a water based fluid. This approach solved the problem of inability to run the screens to target depth, since shale collapse would occur onto the pre-drilled liner, and the space inside the predrilled liner would be substantially free of shales, allowing the screens to be installed to target depth. The problems with this approach were two fold. First, it involved two trips (one for predrilled liner installation and another for screen installation), which is costly, particularly in offshore rigs where rig costs are high. Secondly, a smaller size screen had to be installed into the wellbore, which in some cases can limit production rates, and thus increase the costs.

A more recent approach that has been practiced heavily in two deepwater Angola developments (see SPE 90758 and SPE 107297) and an oilfield in Azerbaijan (see SPE 98146) involved conditioning of the oil based mud by passing the mud through shaker screens of a certain size (to prevent plugging of sand screens), then running the sand screens in conditioned oil based mud, and subsequently displacing the wellbore to water based fluids and proceeding with gravel packing with a water based carrier fluid (U.S. Pat. Nos. 6,883,608 and 7,373,978). This approach has been successfully used in more than 75 wells to date by two major operators, in conjunction with the alternate path (shunt-tube) screens.

Other developments include utilizing solids-free fluids (see SPE 17161-PA and AADE-10-DF-HO-07), in efforts to overcome issues of wellbore destabilization. This solids-free approach in gravel packing fluids has been the widely accepted approach in the industry. Instead of incorporating solids to achieve desired fluid rheology and density, industry has incorporated liquid additives to maintain solids-free gravel pack fluids.

While the above-described methods may be adequate for installing sand screens and gravel packing in many wells formed in reactive shale-containing formations, there exists a continuing need for improvements in the completion fluids used during such methods.

SUMMARY

In one aspect, embodiments disclosed herein relate to a method of gravel packing a wellbore in a subterranean formation, the wellbore comprising a cased section and an uncased section, where the method includes pumping into the wellbore a gravel pack composition comprising gravel and a carrier fluid, where the carrier fluid comprises: an oleaginous fluid and an inorganic solid aggregator material.

In another aspect, embodiments disclosed herein relate to a method of completing a wellbore penetrating a subterranean formation, the wellbore comprising a cased section and an uncased section, where the method includes introducing a fluid into the cased section of the wellbore, where the fluid comprises an oleaginous fluid and an inorganic solid material; running a liner, sand control screen assembly, swell packer assembly, or inflow control device to a selected depth within the uncased section of the wellbore in which the fluid is located, and introducing a gravel pack slurry containing gravel and an oleaginous carrier fluid into the wellbore.

In another aspect, embodiments disclosed herein relate to a method of gravel packing a wellbore in a subterranean formation, the wellbore comprising a cased section and an uncased section, where the method includes pumping into the wellbore a gravel pack composition comprising gravel and a carrier fluid, where the carrier fluid comprises an oleaginous fluid and a weighting agent.

Other aspects and advantages will be apparent from the following description and the appended claims.

BRIEF DESCRIPTION OF DRAWINGS

FIGS. 1A-1D show cross-sectional views of a completion interval depicting various stages of a gravel packing operation.

DETAILED DESCRIPTION

Figure 2:
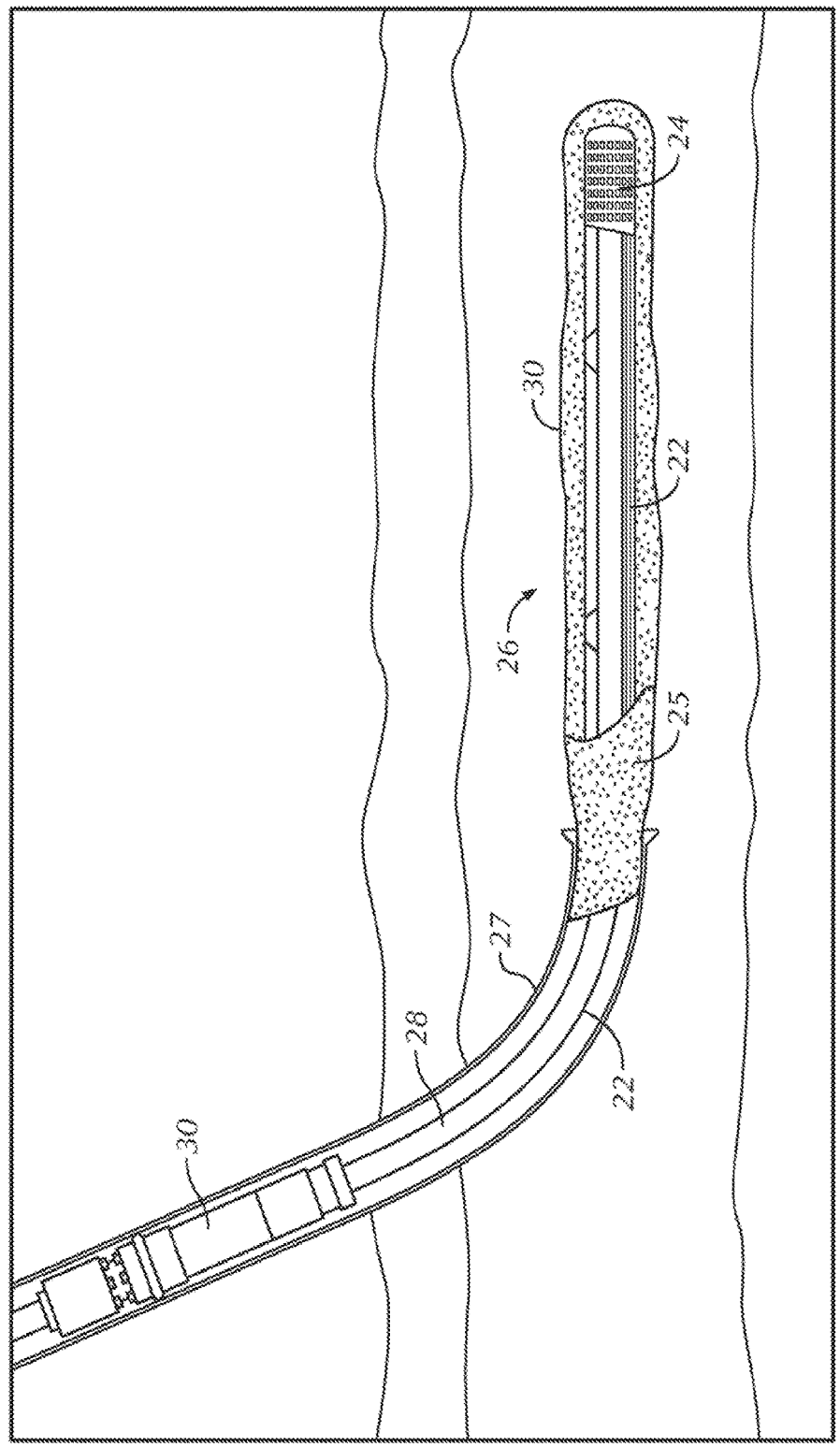
FIG. 2 shows a schematic view of a completion interval depicting a gravel packing operation.

In one aspect, embodiments disclosed herein relate to methods of completion techniques that use oleaginous fluids during the technique(s). More particularly, the present disclosure is directed toward the use of oleaginous-based wellbore fluids in gravel packing and/or installing liners and/or sand control screens in a wellbore that may contain reactive shale or clay or in which the use of an oleaginous-based fluid may otherwise be desirable. As used herein, "oleaginous fluid," "oleaginous-based fluid," "oil-based fluid" or similar expressions may be used interchangeably and refer to a hydrocarbon-based fluid derived from crude oil or chemical synthesis. Illustrative oleaginous fluids include diesel oil, mineral oil, white oil, n-alkanes, synthetic oils, saturated polyalphaolefins, and unsaturated polyalphaolefins. As used herein, the expressions "reactive shale," "reactive clay," or similar expressions may be used interchangeably and refer to those shale or clay materials that may swell, crumble, particalize, flake, slough off or otherwise deteriorate when exposed to aqueous fluids, particularly fresh water. As used herein, "OWR," "oil-to-water ratio," or similar expressions may be used, and refer to the oleaginous-to-non-oleaginous ratio of a fluid. As used herein, "high internal phase ratio (HIPR)" or "high internatal phase emulsions (HIPE)" may be used interchangeably and refer to emulsions where the internal phase of the emulsified fluid is at least 50%. As used herein, an "invert emulsion" is an emulsion where an oleaginous fluid serves as a continuous phase and a non-oleaginous fluid serves as a discontinuous phase, the non-oleaginous fluid being stabilized or emulsified in the oleaginous fluid by an emulsifying agent.

As mentioned above, in the drilling of a well, the drilling fluid is typically circulated through the drill string, through the drill bit at the end of the drill string and up through the annulus between the drilled wellbore and drill string. The circulated drilling fluid is used to carry formation rock present as cuttings or drilled solids that are removed from the wellbore as the drilling fluid is circulated back to the surface.

In the construction of the well, a casing may be positioned within a portion of the drilled wellbore and cemented into place. The portion of the wellbore that is not lined with the casing forms the uncased or open hole section where a sand control screen assembly is placed to facilitate gravel packing for controlling the migration and production of formation sand and to stabilize the formation of the open hole section.

Once the wellbore is drilled and the casing cemented into place, the well may be completed by installing sand screens and gravel packing the open hole section so that produced fluids from the formation are allowed to flow through the gravel pack and sand screen and may be recovered through the wellbore. The open hole section may be any orientation, including vertical and horizontal hole sections.

After the open hole and cased hole sections are displaced with the respective displacement fluids, the drilling string may be removed from the wellbore and the desired sand control screen assembly may be run or lowered to a selected depth within the open hole section of the well bore. The sand screen assembly may be run or lowered into the wellbore on a tubular member or wash pipe, which is used for conducting fluids between the sand screen and the surface. Running the sand screen assembly to the selected depth may include positioning the sand screen in vertical or non-vertical (horizontal) sections of the well. A packer may be positioned and set in the casing above the sand screen to isolate the interval being packed. A crossover service tool may also be provided with the assembly to selectively allow fluids to flow between the annulus formed by the open hole and the screen assembly and the interior of the tubular member and wash pipe.

With the sand control screen assembly in place, a gravel pack slurry containing gravel for forming the gravel pack and a carrier fluid is introduced into the wellbore to facilitate gravel packing of the open hole section of wellbore in the annulus surrounding the sand control screen. The gravel pack slurry is typically introduced into the tubular member where it flows to the cross over tool into the annulus of the open hole section below the packer and the exterior of the sand control screen. As the gravel settles within the open hole section surrounding the screen, the carrier fluid passes through the screen and into the interior of the tubular member. The carrier fluid is conducted to the crossover tool and into the annulus between the casing and the tubular member above the packer.

There are two techniques for gravel packing openhole horizontal wells: "water packing" (or "alpha-beta" packing), and viscous-fluid packing ("alternate path" packing). These techniques have completely different packing mechanisms, each having its own advantages and limitations. However, either packing technique may use an oleaginous fluid of the present disclosure.

Alpha-beta packing involves gravel packing with a low viscosity carrier fluid (conventionally a completion brine) by a high fluid velocity. Gravel is generally added to the fluid at low concentrations and is transported by velocity. Completion brines are conventionally used as the carrier for such technique, as the technique relies on the carrier fluid possessing Newtonian (or near-Newtonian) fluid properties for the annulus to be filled in accordance with this technique. While conventional oil-based fluids have historically not possessed desirable properties (ability to possess low viscosity with high density) for alpha-beta packing, the oleaginous fluids of the present disclosure possess both low viscosity and high density.

Referring to FIGS. 1A-1D, a schematic of a horizontal open hole completion interval of a well that is generally designated 50 being filled by alpha-beta packing is shown. As shown in FIG. 1A, casing 52 is cemented within a portion of a well 54 proximate the heel or near end of the horizontal portion of well 54. A work string 56 extends through casing 52 and into the open hole completion interval 58. A packer assembly 60 is positioned between work string 56 and casing 52 at a cross-over assembly 62. Work string 56 includes one or more sand control screen assemblies such as sand control screen assembly 64. Sand control screen assembly 64 includes a base pipe 70 that has a plurality of openings 72 which allow the flow of fluids therethrough.

Gravel packing the interview is accomplished by delivering fluid slurry 84 down work string 56 into cross-over assembly 62. Fluid slurry 84 exits cross-over assembly 62 through cross-over ports 90 and is discharged into horizontal completion interval 58 as indicated by arrows 92. In the illustrated embodiment of alpha-beta packing, fluid slurry 84 then travels within production interval 58 with portions of the gravel dropping out of the slurry and building up on the low side of wellbore 54 from the heel to the toe of wellbore 54 as indicated by alpha wave front 94 of the alpha wave portion of the gravel pack. At the same time, portions of the carrier fluid pass through sand control screen assembly 64 and travel through annulus 96 between wash pipe assembly 76 and the interior of sand control screen assembly 64. These return fluids enter the far end of wash pipe assembly 76, flow back through wash pipe assembly 76 to cross-over assembly 62, as indicated by arrows 98, and flow into annulus 88 through cross-over ports 100 for return to the surface.

As shown through the progression of FIGS. 1A-1D, the alpha-beta packing operation starts with the alpha wave depositing gravel on the low side of the wellbore 54 progressing from the near end (heel) to the far end (toe) of the production interval. Gravitational forces dominate this "alpha" wave, so gravel settles until reaching an equilibrium height. If fluid flow remains above the crucial velocity for particle transport, gravel will move down a horizontal section toward the toe. Once the alpha wave has reached the far end, a second "beta" wave phase as indicated by beta wave front 118 begins to deposit gravel in the high side of the wellbore, on top of the alpha wave deposition, progressing from the far (toe) end to the near (heel) end of the production interval. The beta wave requires enough fluid velocity to maintain turbulent flow and move gravel along the top of the wellbore annulus. To achieve the properties for alpha-beta packing when using an oleaginous fluid that is an invert emulsion, the OWR is in the range of 95:5 to 35:65. Further, the fluid may be viscosified in such a manner that the fluid possesses Newtonian (or near Newtonian) rheological properties.

As shown in FIG. 2, the gravel slurry 20 is diverted to flow through shunt tubes 22 on the outside of the screen assembly 24, which provide an alternative pathway for the slurry 20. The gravel slurry exits from nozzles (not shown) on the shunt tubes 22 to form a pack 25 in a heel to toe manner. As the gravel settles within the open hole section 26 surrounding the screen 24, the carrier fluid passes through the screen 24 and into the interior of the tubular member 28. The carrier fluid is conducted to the crossover tool 30 and into the annulus between the casing 27 and the tubular member 28 above the packer (not shown). When an invert emulsion fluid is desired, the invert emulsions may be formulated to be HIPR emulsions with viscosifiers (such as those disclosed herein) to formulate a viscosified fluid that may be used to gravel pack by the alternate path technique. In such invert emulsions or in substantially all oil-containing fluids, the viscosifier may be selected by type and amount to result in non-Newtonian fluid properties.

Under either packing technique, the gravel particles may be ceramics, natural sand or other particulate materials suitable for such purposes. The gravel particles are sized so that they will not pass through the screen openings. Typical particle sizes in U.S. mesh size may range from about 12 mesh (1.68 mm) to about 70 mesh (0.210 mm); however, a combination of different particle sizes may be used. Examples of typical particle size combinations for the gravel particles are from about 12/20 mesh (1.68 mm/0.841 mm), 16/20 mesh (1.19 mm/0.841 mm), 16/30 mesh (1.19 mm/0.595 mm), 20/40 mesh (0.841 mm/0.420 mm), 30/50 mesh (0.595 mm/0297 mm), 40/60 mesh (0.420 mm/0.250 mm) and 40/70 mesh (0.420 mm/0.210 mm). The gravel particles may be coated with a resin to facilitate binding of the particles together. The resin-coated particles may be pre-cured or may cure in situ, such as by an overflush of a chemical binding agent or by elevated formation temperatures.

In addition to (or instead of) using the oleaginous fluid as a carrier fluid for gravel packing, in accordance with the present disclosure, the oleaginous fluid may also be used during the placement of sand control screens and/or liners, as well as other completion equipment.

The oleaginous-based fluids of the present disclosure may be used with almost any type of liner or and/or sand control screen assembly. These may include pre-holed liners, slotted, liners, wire-wrapped screens, prepacked screens, direct-wrapped sand screens, mesh screens, premium-type screens, etc. Premium-type screens typically consist of multi-layers of mesh woven media along with a drainage layer. Premium-type screens do not have a well defined screen opening size. In contrast, wire wrap screens consist of wire uniformly wrapped around a perforated base pipe. The wire wrap screens have a relatively uniform screen opening defined as gauge opening. Further, as described above, the sand control screen assembly may also include those with alternate flow paths or shunt tubes. Moreover, screen assemblies may also include those that include diverter valves for diverting fluid returns through a shorter pathway, preventing pressure build up during the gravel packing process. Other completion equipment with which the oleaginous-based fluids may be used includes packer assemblies (including swell packer assemblies), which separate upper annuli from lower production equipment in a well, or inflow control devices, which limit the inflow of fluids into the production tubing) The particular type of equipment is of no limitation on the present disclosure; rather, the oleaginous based fluids may be used with any type of equipment while the equipment is being run in the hole or during subsequent completion operations prior to the well being put into production. Further, depending on the arrangement, one or more of such completion equipment may be used in combination with each other.

In accordance with embodiments of the present disclosure, prior to installing sand control screens and/or gravel packing, the drilling fluid may optionally be first displaced from the open hole section to a displacement fluid, and a second fluid may optionally be used to displace the fluid in a cased hole section. Displacement of the drilling fluids from the open hole section may be carried out by introducing the displacement fluid into the wellbore by passing the displacement fluid through the tubular drill string to the open hole section. As the displacement fluid is pumped through the drill string, the drilling fluids in the open hole section are carried upward through the annulus formed by the casing and the drill string. In a particular embodiment, if the formation includes reactive clays, the displacement fluid for the open hole section may include the oleaginous based fluids of the present disclosure to help maintain the integrity of the open hole section containing reactive shales or clays that could otherwise be damaged if water-based fluids were used to displace the drilling fluids. The volume of first displacement fluid used may be sufficient to displace the open hole section plus the cased hole section up to the packer setting depth.

When a sufficient volume of the first displacement fluid is introduced into the wellbore to displace the drilling fluid from the open hole section of the wellbore, a second displacement fluid (optionally the same or different than the first) is used to displace at least a portion or all of the cased hole section of the wellbore. The volume of the second fluid may be sufficient to displace the entire cased section above the packer setting depth. This may be carried out by raising the end of the tubular drill string so that it is positioned within the cased hole section above the open hole section so that the second displacement fluid is discharged from the end of the drill string into the cased hole section.

Sand control screens and/or liners, or other completion equipment such as packer assemblies (including swell packer assemblies) or inflow control devices (limiting the inflow of fluids into the production tubing) are then run to target depth, which may optionally be in the presence of the invert emulsions of the present disclosure. The sand control screen may be a standalone sand screen or an expandable sand screen. After the sand control screen is installed, the well may be gravel packed with an oleaginous based fluid, as disclosed herein. Further, one of ordinary skill in the art would appreciate that one or more of such completion equipment may be used in combination.

Carrier Fluid

Under either packing technique, and under all methods of the present disclosure, the carrier fluid may be an oleaginous fluid. In some embodiments of the present disclosure, the oleaginous fluid is substantially oil-based. In other embodiments of the present disclosure, the oleaginous fluid is an invert emulsion fluid, where the invert emulsion comprises an oleaginous external phase, a non-oleaginous internal phase, and an emulsifier stabilizing the oleaginous external phase and the non-oleaginous internal phase.

Oil-Based Fluids

As stated above, in some embodiments the carrier fluid is an oil-based fluid, such that at least 95% by volume of the carrier fluid is an oil-based fluid. In other words, less than 5% by volume of the carrier fluid is a non-oleaginous fluid. In such embodiments, the oleaginous fluid is selected from the group including mineral oil; a synthetic oil, such as hydrogenated and unhydrogenated olefins including polyalpha olefins, linear and branch olefins and the like, polydiorganosiloxanes, siloxanes, or organosiloxanes, esters of fatty acids, specifically straight chain, branched and cyclical alkyl ethers of fatty acids, mixtures thereof and similar compounds known to one of skill in the art; and mixtures thereof.

In cases where the oleaginous fluid is substantially oil-based, a viscosifier may also be included. The viscosifier will maintain low rheological properties, and prevent settling of the weight material during both packing techniques. Illustrative viscosifiers include organophilic clays, amine treated clays, organophilic polymers, polyamide resins, polyolefin amides, polycarboxylic acids, metal soaps (such as aluminum stearate), alkyl diamides, alkyl phosphate esters (alone or crosslinked with metal ions, for example), solid thickeners (silica, nanocellulose, etc). Examples of polymeric viscosifiers may include organophilic polyacrylamides, styrene-butadiene polymers, styrene-isoprene polymers, polyisobutylene, polyisoprene, polybutadiene, etc. The amount of viscosifier used in the composition can vary upon the application. However, a concentration of about 0.1% to 6% by weight range is sufficient for most applications. The particular range selected may be based on the type of gravel packing mechanism to be used. Specifically, the amount of viscosifier may affect the rheological properties of a fluid, i.e., whether the fluid is Newtonian, non-Newtonian, or on the scale between strongly Newtonian and strongly non-Newtonian (near-Newtonian), which is relevant to whether the fluid is best used for alpha-beta gravel packing (Newtonian) or an alternative path packing (non-Newtonian). VERSAPAC® is an organic polymer distributed by M-I SWACO, Houston, Tex.; VG-69™ and VG-PLUS™ are organoclay materials distributed by M-I SWACO, Houston, Tex.; and VERSA-HRP™ is a polyamide resin material manufactured and distributed by M-I SWACO, that may be used in the fluids disclosed herein.

In some embodiments, the oleaginous based fluid may also have a sufficiently low Fanning friction factor, which may allow for longer intervals when packing with an alpha-beta packing technique through fluid hydraulics. A Fanning friction factor is a dimensionless number that relates to the shear stress at the wall and may be calculated as $f=2\tau/\rho v^2$, where $\tau$ is the shear stress at the wall, f is the Fanning friction factor, $\rho$ is the density of the fluid, and v is the fluid velocity. The shear stress at the wall may be calculated as $\tau=\Delta PD/4L$, where $\Delta P$ is the pressure drop, D is the diameter of the pipe, and L is the length of the pipe. Fluids having a Fanning friction factor of less than 0.01 may be selected in accordance with some embodiments, and fluids having a Fanning fluid fraction of less than 0.007 may be selected in other embodiments. Such friction factors may be experimentally calculated for a given fluid by pumping a fluid sample through a tubing of ⅜ inch nominal diameter (actual ID of 0.305 inches) at a specified flow rate (in the range of 5-5.5 gpm), and by measuring the resulting pressure drop across a length of 16.25 feet of tubing.

In some embodiments, a friction reducer may be incorporated into a substantially oil-based fluid to reduce the friction of the fluid and allow for longer intervals during gravel packing. Examples of such friction reducers that may be used in an oil-based fluid may include, for example, polyalphaolefins such as polyisobutylene, organophilic polyacrylamides, as well as various dispersants known in the art, including amidoamine surfactants, which may be provided alone or in an inert liquid carrier such as vegetable oil, alcohols, glycols, and water. It is also noted that the friction reducer may be incorporated as an independent additive or may be used in conjunction with one or more other components.

Invert Emulsion Fluids

As discussed above, the methods of the present disclosure may use an invert emulsion fluids having an oleaginous-to-non-oleaginous ratio of 90:10 to 10:90.

Oil-in-water emulsions are typically stabilized by both electrostatic stabilization (electric double layer between the two phases) and steric stabilization (van der Waals repulsive forces), whereas invert emulsions (water-in-oil) are typically stabilized by only steric stabilization. Because only one mechanism can be used to stabilize an invert emulsion, invert emulsions are generally more difficult to stabilize, particularly at higher levels of the internal phase, and often experience highly viscous fluids.

Invert emulsion fluids of the present disclosure may have OWR ranging 65:35 to 10:90, depending on the completion technique and the conditions of the wellbore. In cases where the invert emulsion fluid is a HIPR emulsion with an OWR of less than 50/50, the invert emulsion fluid is stabilized by an emulsifying agent without significant increases in viscosity. Additionally, by virtue of the greater internal phase concentration, weight may be provided to the fluid partly through the inherent weight of the aqueous or other internal phase, thus minimizing the need for external agents to increase the density of the fluid.

As the internal non-oleginous phase of a given fluid system increases, the viscosity and rheological profile of the fluid also increases due to the greater concentration of the dispersed internal phase. However, HIPR invert emulsion fluids may possess rheological profiles more similar to fluids having a lower internal phase concentration, i.e., >50/50 O/W. In particular, in accordance with embodiments of the present disclosure, the fluids may possess a high shear viscosity of less than 200 at 600 rpm, and a low shear viscosity of less than 40 at 6 and 3 rpm, and less than 20 at 6 and 3 rpm in particular embodiments (all of which are measured using a Fann 35 Viscometer from Fann Instrument Company (Houston, Tex.) at 120° F.

The invert emulsion fluid may also possess an internal non-oleaginous phase that is stably emulsed within the external oleaginous phase. Specifically, upon application of an electric field to an invert emulsion fluid, the emulsified non-oleaginous phase, which possesses charge, will migrate to one of the electrodes used to generate the electric field. The incorporation of emulsifiers in the invert emulsion fluid stabilizes the emulsion and results in a slowing of the migration rate and/or increased voltage for breakage of the emulsion. Thus, an electrical stability (ES) test, specified by the American Petroleum Institute at API Recommended Practice 13B-2, Third Edition (February 1998), is often used to determine the stability of the emulsion. ES is determined by applying a voltage-ramped, sinusoidal electrical signal across a probe (consisting of a pair of parallel flat-plate electrodes) immersed in the mud. The resulting current remains low until a threshold voltage is reached, whereupon the current rises very rapidly. This threshold voltage is referred to as the ES ("the API ES") of the mud and is defined as the voltage in peak volts-measured when the current reaches 61 µA. The test is performed by inserting the ES probe into a cup of 120° F. [48.9° C.] mud applying an increasing voltage (from 0 to 2000 volts) across an electrode gap in the probe. The higher the ES voltage measured for the fluid, the stronger or harder to break would be the emulsion created with the fluid, and the more stable the emulsion is. Thus, the present disclosure relates to invert emulsion fluids having a high internal phase ratio but that also have an electrical stability of at least 50 v and at least 100 v or 150 v in more particular embodiments.

Further, the present disclosure also relates to fluids having a high internal phase ratio wherein the emulsion droplet size is smaller as compared to conventional emulsion droplets. For example, the non-oleaginous phase distributed in the oleaginous phase may have an average diameter in the range of 0.5 to 5 microns in one embodiment, and in the range of 1 to 3 microns in a more particular embodiment. The droplet size distribution may generally such that at least 90% of the diameters are within 20% or especially 10% of the average diameter. In other embodiments, there may be a multimodal distribution. This droplet size may be approximately one-third to one-fourth the size of emulsion droplets formed using conventional emulsifiers. In a particular embodiment, the emulsion droplets may be smaller than the solid weighting agents used in the fluids.

The oleaginous fluid may be a liquid and more preferably is a natural or synthetic oil and more preferably the oleaginous fluid is selected from the group including diesel oil; mineral oil; a synthetic oil, such as hydrogenated and unhydrogenated olefins including polyalpha olefins, linear and branch olefins and the like, polydiorganosiloxanes, siloxanes, or organosiloxanes, esters of fatty acids, specifically straight chain, branched and cyclical alkyl ethers of fatty acids, mixtures thereof and similar compounds known to one of skill in the art; and mixtures thereof. In a particular embodiment, the fluids may be formulated using diesel oil or a synthetic oil as the external phase. The oleaginous fluid in one embodiment may include at least 5% by volume of a material selected from the group including esters, ethers, acetals, dialkylcarbonates, hydrocarbons, and combinations thereof.

The concentration of the oleaginous fluid should be sufficient so that an invert emulsion forms. More specifically, the amount of oleaginous fluid is from about 70% to about 10% by volume, depending on the completion operation. In cases where the completion operation is alpha-beta gravel packing, then the oleaginous-to-non-oleaginous ratio is in the range of 65:35 to 35:65, and in the range of 45:55 to 55:45 in a more particular embodiment. Where the completion operation is alternate path technology, the oleaginous-to-non-oleaginous ratio is in the range of 30:70 to 10:90, and from 35:65 to 15:85 in a more particular embodiment.

The non-oleaginous fluid used in the formulation of the invert emulsion fluid disclosed herein is a liquid and preferably is an aqueous liquid. More preferably, the non-oleaginous liquid may be selected from the group including sea water, a brine containing organic and/or inorganic dissolved salts, liquids containing water-miscible organic compounds and combinations thereof. For example, the aqueous fluid may be formulated with mixtures of desired salts in fresh water. Such salts may include, but are not limited to alkali metal chlorides, hydroxides, or carboxylates, for example. In various embodiments of the drilling fluid disclosed herein, the brine may include seawater, aqueous solutions wherein the salt concentration is less than that of sea water, or aqueous solutions wherein the salt concentration is greater than that of sea water. Salts that may be found in seawater include, but are not limited to, sodium, calcium, aluminum, magnesium, potassium, strontium, and lithium, salts of chlorides, bromides, carbonates, iodides, chlorates, bromates, formates, nitrates, oxides, phosphates, sulfates, silicates, and fluorides. Salts that may be incorporated in a given brine include any one or more of those present in natural seawater or any other organic or inorganic dissolved salts. Additionally, brines that may be used in the drilling fluids disclosed herein may be natural or synthetic, with synthetic brines tending to be much simpler in constitution. A brine may include halide, formate, phosphate, polytungstate, or carboxylate salts of mono- or divalent cations of metals, such as cesium, potassium, calcium, zinc, and/or sodium. The density of the drilling fluid may be controlled by increasing the salt concentration in the brine (up to saturation).

The amount of the non-oleaginous fluid is typically less than the theoretical limit needed for forming an invert emulsion. The amount of non-oleaginous fluid is more than about 30% by volume, depending on the completion operation. In cases where the completion operation is alpha-beta gravel packing, then the oleaginous-to-non-oleaginous ratio is in the range of 65:35 to 35:65. Where the completion operation is alternate path technology, the oleaginous-to-non-oleaginous ratio is in the range of 30:70 to 10:90.

One example of an emulsifying agent that may stabilize the emulsion of the non-oleaginous fluid within the oleaginous fluid is an emulsifier formed from $C_{15-40}$ polyolefins, polyamides with a molecular weight greater than 1200, and amines. Regardless of the chemical composition of the emulsifier used in invert emulsion fluids of the present disclosure, the emulsifier may be used in an amount ranging from 1 to 10 pounds per barrel.

The term "HLB" (Hydrophilic Lipophilic Balance) refers to the ratio of the hydrophilicity of the polar groups of the surface-active molecules to the hydrophobicity of the lipophilic part of the same molecules. An HLB value may be calculated by considering the molecular weight contributions of the respective hydrophilic and lipophilic portions and taking the ratio thereof (divided by 5). Generally, the Bancroft rule applies to the behavior of emulsions: emulsifiers and emulsifying particles tend to promote dispersion of the phase in which they do not dissolve very well; for example, a compound that dissolves better in water than in oil tends to form oil-in-water emulsions (that is they promote the dispersion of oil droplets throughout a continuous phase of water). Emulsifiers are typically amphiphilic. That is, they possess both a hydrophilic portion and a hydrophobic portion. The chemistry and strength of the hydrophilic polar group compared with those of the lipophilic nonpolar group determine whether the emulsion forms as an oil-in-water or water-in-oil emulsion. In particular, emulsifiers may be evaluated based on their HLB value. To form an invert emulsion, an emulsifier (or a mixture of emulsifiers) having a low HLB may be desirable. Emulsifiers of the present disclosure have an HLB less than 3.

Emulsifiers used in invert emulsions may include $C_{15-40}$ polyolefins, polyamides with a molecular weight greater than 1200, and amines. The term "amine number" refers to the ratio of the mass of potassium hydroxide which consumes exactly as much acid on neutralization as does the sample being examined, to the mass of that sample. Emulsifiers of the present disclosure have an amine number in the range of 25-50. In one embodiment, the emulsifier may be a polyalkenyl succinimide compound. However, it is also within the scope of the present disclosure that other emulsifiers may be used in other embodiments.

Inorganic Solid Aggregation Material

The fluids of the present disclosure may also include an inorganic solid aggregation material. Historically, gravel pack fluids have remained solids-free because of the damage that a solid can cause to the formation. However, it has been surprisingly discovered that the composition and sizing of the inorganic solid aggregation material will improve the performance of the oleaginous-based fluid and minimize damage to the formation.

The inorganic solid aggregation material of the present disclosure may improve the wettability of the gravel pack, thereby resulting in a tighter packing. Further, inorganic solid aggregation materials of the present disclosure may also reduce top oil separation, and in some cases eliminate top oil separation in the case of invert emulsions. Top oil separation measures the amount of oil that has separated from the invert emulsion. While some oil may separate, the emulsion has not been completely broken because at least a portion of the invert emulsion fluid remains. However, the rheological properties of the remaining invert emulsion fluid may be adversely impacted by top oil separation. Inorganic solid aggregation materials suitable for use in the fluids disclosed herein include calcium hydroxide, calcium oxide, calcium carbonate, silica, and combinations thereof. The quantity of the inorganic solid material depends on the composition of the oleaginous and non-oleaginous phases. The inorganic solid aggregation material may be used in an amount in the range of 0.1 to 10 pounds per barrel, and more preferably in the range of 0.4 to 5 pounds per barrel. As previously discussed, the sizing of the inorganic solid aggregation material will impact its suitability for use in the invert emulsion fluid of the present disclosure. The sizing of the inorganic solid material will vary depending on the inorganic solid aggregation material used. The inorganic solid aggregation material may be sized to have a $d_{50}$ less than 100 microns, and more preferably sized to have a $d_{50}$ less than 10 microns.

Weighting Agents

The fluids of the present disclosure may also include weighting agents. Weighting agents or density materials (other than the inherent weight provided by the internal aqueous phase) suitable for use the fluids disclosed herein may include barium sulfate, calcium carbonate, galena, hematite, magnetite, iron oxides, illmenite, siderite, celestite, dolomite, calcite, manganese oxide, and combinations thereof. The quantity of such material added, if any, depends upon the desired density of the final composition. The weighting agent may be coated or uncoated, and may be sized to have a $d_{50}$ less than 25 microns, and more preferably a $d_{50}$ less than 10 microns.

The solid weighting agents may be of any particle size (and particle size distribution), but some embodiments may include weighting agents having a smaller particle size range than API grade weighing agents, which may generally be referred to as micronized weighting agents. Such weighting agents may generally be in the micron (or smaller) range, including submicron particles in the nanosized range.

In some embodiments, the average particle size (d50) of the weighting agents may range from a lower limit of greater than 5 nm, 10 nm, 30 nm, 50 nm, 100 nm, 200 nm, 500 nm, 700 nm, 0.5 micron, 1 micron, 1.2 microns, 1.5 microns, 3 microns, 5 microns, or 7.5 microns to an upper limit of less than 500 nm, 700 microns, 1 micron, 3 microns, 5 microns, 10 microns, 15 microns, 20 microns, where the particles may range from any lower limit to any upper limit. In other embodiments, the d90 (the size at which 90% of the particles are smaller) of the weighting agents may range from a lower limit of greater than 20 nm, 50 nm, 100 nm, 200 nm, 500 nm, 700 nm, 1 micron, 1.2 microns, 1.5 microns, 2 microns, 3 microns, 5 microns, 10 microns, or 15 microns to an upper limit of less than 30 microns, 25 microns, 20 microns, 15 microns, 10 microns, 8 microns, 5 microns, 2.5 microns, 1.5 microns, 1 micron, 700 nm, 500 nm, where the particles may range from any lower limit to any upper limit. The above described particle ranges may be achieved by grinding down the materials to the desired particle size or by precipitation of the material from a bottoms up assembly approach. Precipitation of such materials is described in U.S. Pat. No. 2010/009874, which is assigned to the present assignee and herein incorporated by reference. One of ordinary skill in the art would recognize that, depending on the sizing technique, the weighting agent may have a particle size distribution other than a monomodal distribution. That is, the weighting agent may have a particle size distribution that, in various embodiments, may be monomodal, which may or may not be Gaussian, bimodal, or polymodal.

In one embodiment, a weighting agent is sized such that: particles having a diameter less than 1 microns are 0 to 15 percent by volume; particles having a diameter between 1 microns and 4 microns are 15 to 40 percent by volume; particles having a diameter between 4 microns and 8 microns are 15 to 30 by volume; particles having a diameter between 8 microns and 12 microns are 5 to 15 percent by volume; particles having a diameter between 12 microns and 16 microns are 3 to 7 percent by volume; particles having a diameter between 16 microns and 20 microns are 0 to 10 percent by volume; particles having a diameter greater than 20 microns are 0 to 5 percent by volume. In another embodiment, the weighting agent is sized so that the cumulative volume distribution is: less than 10 percent or the particles are less than 1 microns; less than 25 percent are in the range of 1 microns to 3 microns; less than 50 percent are in the range of 2 microns to 6 microns; less than 75 percent are in the range of 6 microns to 10 microns; and less than 90 percent are in the range of 10 microns to 24 microns.

Coated weighting agents may be formed by grinding a solid particulate material and polymeric dispersing agent so that the dispersing agent is absorbed to the surface of the resulting solid particles. The grinding may be carried out in the presence of either an oleaginous base fluid or a non-oleaginous base fluid. Where the grinding is carried out in the presence of an oleaginous fluid, the polymeric dispersing agent is selected from oleic acid, polybasic fatty acids, alkylbenezen sulfonic acids, alkane sulfonic acids, linear alpha-olefin sulfonic acids, or the alkaline earth metal salts of any of the above acids, phospholipids, and a polyacrylate ester made from at least one of the following monomers: stearyl methacrylate, butyacrulate, and acrylic acid. Where the grinding is carried out in the presence of a non-oleaginous base fluid, the polymeric dispersing agent may be a water soluble polymer that is a homopolymer or copolymer of monomers selected from the group consisting of acrylic acid, itaconic acid, maleic acid or anhydride, hydroxypropyl acrylate vinylsulphonic acid, acrylamido 2-propane sulphonic acid, acrylamide, styrene sulphonic acid, acrylic phosphate esters, methyl vinyl ether and vinyl acetate, wherein the acid monomers may also be neutralized to a salt.

Weighting agents may also be coated through a dry process, where the weighting agent is dry blended with a polymeric dispersing agent, as discussed in U.S. Ser. No. 11/741,199, which is assigned to the present assignee and is hereby incorporated by reference. The polymeric dispersing agent for the dry blending process may be selected from the group consisting of polyacrylate esters, oleic acid, polybasic fatty acids, alkylbenzene sulfonic acids, alkane sulfonic acids, linear alpha olefins sulfonic acid, alkaline earth metal salts of any of the above acids, phospholipids, and combinations thereof.

Weighting agents may also be formed by chemical precipitation, as discussed in U.S. application Ser. No. 12/440,706, which is assigned to the present assignee and is hereby incorporated by reference. The precipitation occurs following the mixing of at least two chemical species mixed in a solution. The chemical identity of those chemicals mixed will depend on the desired resulting compound to be sued as a weighting agent. For example, when a barium sulfate weighting agent is desired, a barium sulfate salt solution may be mixed with an alkali sulfate salt solution. Alternatively, where calcium carbonate is desired, a calcium hydroxide solution combined with carbon dioxide results in the formation of calcium carbonate. Where a coating is desired, the precipitation may be conducted in the presence of a dispersant or wetting agent, or the coating can be applied after precipitation.

Typically, weighting material may be added to result in a fluid density of up to about 24 pounds per gallon (but up to 21 pounds per gallon or up to 19 pounds per gallon in other particular embodiments). Additionally, it is also within the scope of the present disclosure that the fluid may also be weighted up using salts (such as in the non-oleaginous fluid (often aqueous fluid) discussed below). One having ordinary skill in the art would recognize that selection of a particular material may depend largely on the density of the material as typically, the lowest wellbore fluid viscosity at any particular density is obtained by using the highest density particles.

Other Additives

Other additives that may be included in the wellbore fluids disclosed herein include for example, wetting agents, organophilic clays, viscosifiers, surfactants, dispersants, interfacial tension reducers, pH buffers, mutual solvents, thinners, thinning agents and cleaning agents. The addition of such agents should be well known to one of ordinary skill in the art of formulating drilling fluids and muds.

Wetting agents that may be suitable for use in the fluids disclosed herein include crude tall oil, oxidized crude tall oil, surfactants, organic phosphate esters, modified imidazolines and amidoamines, alkyl aromatic sulfates and sulfonates, and the like, and combinations or derivatives of these. However, when used with the invert emulsion fluid, the use of fatty acid wetting agents should be minimized so as to not adversely affect the reversibility of the invert emulsion disclosed herein. FAZE-WET™, VERSA-COAT™, SUREWET™, VERSAWET™, and VERSAWET™ NS are examples of commercially available wetting agents manufactured and distributed by M-I L.L.C. that may be used in the fluids disclosed herein. Silwet L-77, L-7001, L7605, and L-7622 are examples of commercially available surfactants and wetting agents manufactured and distributed by General Electric Company (Wilton, Conn.).

As discussed above, viscosifying agents that may be used in the fluids disclosed herein include organophilic clays, amine treated clays, oil soluble polymers, polyamide resins, polycarboxylic acids, and soaps, particularly during gravel packing by the alternate path technique (viscous fluid packing). The amount of viscosifier used in the composition can vary upon the end use of the composition. However, normally about 0.1% to 6% by weight range is sufficient for most applications. VG-69™ and VG-PLUS™ are organoclay materials distributed by M-I SWACO, Houston, Tex., and VERSA-HRP™ is a polyamide resin material manufactured and distributed by M-I SWACO, that may be used in the fluids disclosed herein. While such viscosifiers may be particularly useful during viscous fluid packing, they viscosifiers may also be incorporated into the fluid formulation for other completion operations as well.

The fluids disclosed herein are especially useful in the drilling, completion and working over of subterranean oil and gas wells. In particular the fluids disclosed herein may find use in formulating drilling muds and completion fluids that allow for the easy and quick removal of the filter cake. Such muds and fluids are especially useful in the drilling of horizontal wells into hydrocarbon bearing formations. Conventional methods can be used to prepare the completion fluids disclosed herein in a manner analogous to those normally used, to prepare conventional oil-based fluids. In cases where an invert emulsion is desired, a desired quantity of oleaginous fluid such as a base oil and a suitable amount of a surfactant are mixed together and the remaining components are added sequentially with continuous mixing. An invert emulsion may also be formed by vigorously agitating, mixing or shearing the oleaginous fluid and the non-oleaginous fluid.

EXAMPLE

The following examples were used to test the stability and rheological properties of a high internal phase ratio invert emulsion, such as those described in the present disclosure.

Example 1

A 13.5 ppg invert emulsion fluid was formulated having the following components, as shown below in Table 1. Specifically, the components include ESCAID® 110, a C16-C18 internal olefin as the base oil; a 14.2 ppg calcium bromide brine; BioAdd™ 778, an emulsifier available from Shrieve Chemical Products (Spring, Tex.); lime; and WARP® concentrate, a micronized weighting agent available from M-I SWACO (Houston, Tex.).

TABLE 1

| Components | |
|---|---|
| IO C16-C18 | 16.2% (vol) |
| CaBr$_2$ brine | 69.4% (vol) |
| BioAdd ™ 778 | 3.5 ppb |
| Lime | 0.87 ppb |
| WARP ® concentrate | 13.2% (vol) |

The invert emulsion fluid shown in Table 1 was heat aged at the temperatures shown below in Table 2 by hot rolling for 16 hours, and the rheological properties of the various mud formulations were determined using a Fann Model 35 Viscometer, available from Fann Instrument Company. The fluid was subjected to the pressures indicated below. PV is plastic viscosity, YP is yield point, K' and n' are power law constants calculated by Hydragram/Mudware software. K' is the Fann 35 300 reading/511$^{n'}$ and n' is 3.32 log$_{10}$ (Fann 35 600 reading/Fann 35 300 reading). The fluid exhibited the following properties:

TABLE 2

| | Result with Farm 35 atmosphere | | Result with Farm 70 w/pressure | |
|---|---|---|---|---|
| | Room temp Dial vs. cP | 150 F. Dial vs. cP | 150 F. - 526 psi Dial vs. cP | 275 F. - 473 psi Dial vs. cP |
| 600 | 480 vs. 240 | 250 - 125 | 312 - 156 | 136 - 68 |
| 300 | 315 - 315 | 170 - 170 | 243 - 243 | 80 - 80 |
| 200 | 240 - 360 | 130 - 195 | 183 - 275 | 58 - 87 |
| 100 | 155 - 465 | 90 - 270 | 110 - 330 | 34 - 102 |
| 6 | 25 - 1250 | 17.5 - 875 | 17 - 850 | 5 - 250 |
| 3 | 15 - 1500 | 12.5 - 1250 | 11 - 1100 | 4 - 400 |
| PV | 165 | 80 | 69 | 56 |
| YP | 150 | 90 | 174 | 24 |
| K' slot | 0.06195 | 0.05665 | 0.04425 | 0.01346 |
| n' | 0.6526 | 0.5696 | 0.6532 | 0.6570 |

Upon addition of gravel (at mesh size 20/40) to the fluid shown in Table 1, can suspend the gravel at both room temperature and 275° F. for greater than 30 minutes, indicating it can be used for alternate path packing.

Example 2

An invert emulsion fluid was formulated having the following components, as shown below in Table 3. Specifically, the components include LVT-200, mineral oil as the base oil; a 18.3 ppg cesium formate brine; and BioAdd™ 778, an emulsifier available from Shrieve Chemical Products (Spring, Tex.

TABLE 3

| Components | |
|---|---|
| LVT 200 | 48.1% (vol) |
| Cs formate brine | 50% (vol) |
| BioAdd ™ 778 | 6 ppb |

The fluid in Table 3 was also formulated with 1 ppb lime added thereto. Both formulations possessed the same Fann 35 dial readings (at 72° F.): 600 rpm=49, 300 rpm=26, 200 rpm=19, 100 rpm=10, 6 rpm=1, 3 rpm=1. The fluid without lime resulted in top oil separation of 33% after 1 day, and 38% after 2 days. In contrast, the fluid formulation with lime resulted in a reduced top oil separation of 26% after 1 day and 32% after 2 days. Further, upon addition of 20/40 gravel to the fluid, the fluid formulation without lime resulted in a very loose packing, whereas the lime addition resulted in a significantly tighter packing of the gravel.

A 13 ppg (Fluids A and B) and a 16 ppg fluid (Fluids C and D) were formulated having the components as shown below in Table 4. Specifically, the components include IO 16/18, an isomerized C$_{16}$ to C$_{18}$ alpha-olefin as the base oil; WARP® concentrate, a micronized weighting agent available from M-I SWACO® (Houston, Tex.), and VERSAPAC®, an organic polymer available from M-I SWACO® (Houston, Tex.).

TABLE 4

| | A | B | C | D |
|---|---|---|---|---|
| IO Oil Base WARP, bbl | 0.515 | 0.515 | 0.755 | 0.755 |
| IO 16/18, bbl | 0.485 | 0.485 | 0.245 | 0.245 |
| VERSAPAC, ppb | — | 2 | — | 2 |

Fluids B and D shown in Table 4 were heat aged at 140° F. by hot rolling for 16 hours, and the rheological properties of the various mud formulations were determined using a Fann Model 35 Viscometer, available from Fann Instrument Company. The fluids were subjected to the pressures indicated below. The fluids exhibited the following properties:

TABLE 5

| | A | B | | C | D | |
|---|---|---|---|---|---|---|
| | Initial | Initial | Aged | Initial | Initial | Aged |
| 600 rpm | 14 | 14 | 15 | 28 | 31 | 36 |
| 300 rpm | 8 | 7 | 9 | 15 | 16 | 19 |
| 200 rpm | 6 | 6 | 6 | 10 | 11 | 13 |
| 100 rpm | 3 | 3 | 3 | 5 | 6 | 7 |
| 6 rpm | 1 | 1 | 1 | 1 | 2 | 1 |
| 3 rpm | 1 | 1 | 1 | 0 | 1 | 1 |
| PV, cps | 6 | 7 | 6 | 13 | 15 | 17 |
| YP, lbs/100 ft$^2$ | 2 | 0 | 3 | 2 | 1 | 2 |

TABLE 5-continued

| | A | B | | C | D | |
|---|---|---|---|---|---|---|
| | Initial | Initial | Aged | Initial | Initial | Aged |
| 10 Second Gel | 1 | 1 | 1 | 1 | 1 | 1 |
| 10 Minute Gel | 1 | 1 | 1 | 1 | 1 | 1 |
| Settling (Y/N) | Y | N | N | Y | N | N |

The aged fluids (B and D) were then evaluated to determine the time it took the fluids to pass through a 1-inch sand bed and 230 micron premium screen Production Screen Tester. The fluids exhibited the following times, provided in Table 6:

TABLE 6

| | B - Aged | D - Aged |
|---|---|---|
| Test Pressure | 10 | 10 |
| Screen Type | Premium | Premium |
| Screen Size | 230 microns | 230 microns |
| 1" Sand-bed size | 12/20 | 12/20 |
| Time, seconds | 6 | 6 |
| Volume passed through Screen, mL | 200 | 200 |
| 1" Sand-bed size | 30/50 | 30/50 |
| Time, seconds | 8 | 7 |
| Volume passed through Screen, mL | 200 | 200 |
| 1" Sand-bed size | 50/70 | 50/70 |
| Time, seconds | 10 | 13 |
| Volume passed through Screen, mL | 200 | 200 |

Example 3

Several fluids were formulated to determine of effect of the fluid composition on the Fanning friction factor. The fluids were composed of one or more of LVT-200 oil, an oil-based fluid containing a micronized weighting agent, and an invert emulsion, each of which are considered with and without a friction reducer (NECADD 370 is a polyalphaolefin friction reducer available from MI SWACO (Houston, Tex.) and HE150 is an AMPS-based friction reducer). The Fanning friction factor was calculated by pumping a fluid sample through a tubing of ⅜ inch nominal diameter (actual ID of 0.305 inches) at a specified flow rate (listed in Table 7), and by measuring the resulting pressure drop across a length of 16.25 feet of tubing.

TABLE 7

| Test # | Fluid | Fluid density ($\rho$), ppg | Flow rate (gpm) | Pressure drop ($\Delta P$), psi | Wall shear stress, ($\tau_w$), Pa | Fluid velocity (v), m/s | Fanning friction factor (f) |
|---|---|---|---|---|---|---|---|
| 1 | LVT-200 oil | 6.8 | 5.1 | 77.9 | 209.96 | 6.82 | 0.01108 |
| 2 | LVT-200 oil with friction reducer; LVT200 + 100 ppm NECADD 370 | 6.8 | 5.1 | 31.9 | 85.98 | 6.82 | 0.00454 |
| 3 | OB WARP | 15.7 | 5 | 148 | 398.90 | 6.68 | 0.00949 |
| 4 | OB WARP with friction reducer; 4.8 gal OB WARP with 40 ml NECADD 370 | 15.7 | 5 | 88 | 237.18 | 6.68 | 0.00564 |
| 5 | Invert emulsion: LVT-11CaCl 50:50, 6 ppb BioAdd 778 | 9.1 | 5.4 | 82.2 | 221.55 | 7.22 | 0.00780 |
| 6 | Invert emulsion with friction reducer; LVT-11CaCl 50:50, 6 ppb BioAdd 778, 0.5 v % HE150 | 9 | 5.3 | 88.3 | 237.99 | 7.08 | 0.00879 |

As shown in Table 7, incorporation of a friction reducer results in a reduced Fanning friction factor for the substantially oil fluids (fluids 1-2) as well as for the OB WARP containing fluids (fluids 3-4), but showed no impact on the invert emulsion (fluids 5-6).

Advantageously, embodiments of the present disclosure may provide fluids particularly suitable for use in open hole completion operations, as a displacement fluid, for running liners and/or sand control screens, as well as gravel packing by with alpha and beta waves or by an alternate path technique. The fluids disclosed herein may make it practical for a well to be drilled and completed only with oil-based fluids, avoiding contact of the formation with brines, which can have a negative effect on the production of the wells. Such fluids may be particularly desirable for use in open hole wells exposed to reactive shales, by minimizing the potential contact of such reactive shales with water.

While the disclosure has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed:

1. A method of gravel packing a wellbore in a subterranean formation, the wellbore comprising a cased section and an uncased section, the method comprising:
   pumping into the wellbore a gravel pack composition comprising gravel and a carrier fluid, the carrier fluid comprising:
   an oleaginous fluid; and
   an inorganic solid aggregator material selected from calcium hydroxide, calcium oxide, silica, and combinations thereof having a d50 of less than 100 microns, and wherein the carrier fluid has a fanning friction factor of less than 0.01, calculated by pumping a fluid sample through a tubing having an inner diameter of 0.305 inches at a specified flow rate in the range of 5-5.5 gpm, and by measuring a resulting pressure drop across a length of 16.25 feet of tubing.

2. The method of claim 1, further comprising:
packing the uncased section of the wellbore with gravel using alpha and beta waves of the carrier fluid.

3. The method of claim 1, further comprising:
packing the uncased section of the wellbore with gravel using alternate path technology.

4. The method of claim 1, wherein the inorganic solid aggregator material has a d50 less than 10 microns.

5. The method of claim 1, wherein the oleaginous fluid consists essentially of a base fluid selecting from the group consisting of diesel oil, mineral oil, white oil, n-alkanes, synthetic oil, saturated polyalpha olefins, unsaturated polyalpha olefins, and combinations thereof.

6. The method of claim 1, wherein the oleaginous fluid comprises an invert emulsion, wherein the invert emulsion comprises:
an oleaginous external phase;
a non-oleaginous internal phase; and
an emulsifier stabilizing the oleaginous external phase and the non-oleaginous internal phase.

7. The method of claim 6, wherein the invert emulsion fluid has an oleaginous-to-non-oleaginous ratio in the range of 30:70 to 10:90.

8. The method of claim 6 wherein the invert emulsion fluid has an oleaginous-to-non-oleaginous ratio in the range of 35:65 to 15:85.

9. The method of claim 6, wherein the emulsifier is formed from C15-40 polyolefins, polyamides with a molecular weight greater than 1200, and amines.

10. The method of claim 6, wherein the emulsifier has an amine number in the range of 25-50.

11. The method of claim 6, wherein the emulsifier has an HLB less than 3.

12. The method of claim 1, wherein the carrier fluid has a fanning friction factor of less than 0.007, calculated by pumping a fluid sample through a tubing having an inner diameter of 0.305 inches at a specified flow rate in the range of 5-5.5 gpm, and by measuring a resulting pressure drop across a length of 16.25 feet of tubing.

13. The method of claim 1, wherein the oleaginous fluid further comprises a weighting agent having a d50 less than 10 microns.

14. The method of claim 13, wherein the weighting agent is selected from the group consisting of barium sulfate, calcium carbonate, dolomite, ilmenite, hematite, olivine, siderite, strontium sulfate, manganese oxide, and combinations thereof.

15. The method of claim 13, wherein the weighting agent is coated with a dispersant.

16. A method of completing a wellbore penetrating a subterranean formation, the wellbore comprising a cased section and an uncased section, the method comprising:
introducing an oleaginous fluid into the uncased section of the wellbore, thereby displacing a drilling fluid from the uncased section of the wellbore;
running a liner, sand control, screen assembly, swell packer assembly, or inflow control device to a selected depth within the uncased section of the wellbore in which the oleaginous fluid is located; and
introducing a gravel pack slurry containing gravel and an oleaginous carrier fluid into the wellbore.

17. The method of claim 16, wherein introducing the oleaginous fluid into the uncased section of the wellbore comprises drilling the wellbore through the subterranean formation with the oleaginous fluid.

18. The method of claim 16, wherein the oleaginous fluid further comprises an inorganic solid aggregator material having a d50 less than 100 microns.

19. The method of claim 18, wherein the inorganic solid aggregator material has a d50 less than 10 microns.

20. The method of claim 18, wherein the inorganic solid aggregator material is selected from the group consisting of calcium hydroxide, calcium oxide, calcium carbonate, silica, and combinations thereof.

21. The method of claim 16, wherein the oleaginous fluid is an invert emulsion, wherein the invert emulsion comprises:
an oleaginous external phase;
a non-oleaginous internal phase; and
an emulsifier stabilizing the oleaginous external phase and the non-oleaginous internal phase.

22. The method of claim 21, wherein the emulsifier is formed from C15-40 polyolefins, polyamides with a molecular weight greater than 1200, and amines.

23. The method of claim 21, wherein the emulsifier has an amine number in the range of 25-50.

24. The method of claim 21, wherein the emulsifier has an HLB less than 3.

25. The method of claim 21, wherein the oleaginous fluid consists essentially of a base fluid selected from the group consisting of diesel oil, mineral oil, white oil, n-alkanes, synthetic oil, saturated polyalpha olefins, unsaturated polyalpha olefins, and combinations thereof.

26. The method of claim 25, wherein the carrier fluid has a fanning friction factor of less than 0.01, calculated by pumping to fluid sample through as tubing having an inner diameter of 0.305 inches at a specified how rate in the range of 5-5.5 gpm, and by measuring a resulting pressure drop across a length of 16.25 feet of tubing.

27. The method of claim 26, wherein the carrier fluid has a fanning friction factor of less than 0.007, calculated by pumping a fluid sample through a tubing having an inner diameter of 0.305 inches at a specified flow rate in the range of 5-5.5 gpm, and by measuring a resulting pressure drop across a length of 16.25 feet of tubing.

28. The method of claim 16, wherein the oleaginous fluid further comprises a weighting agent having a d50 less than 10 microns.

29. The method of claim 28, wherein the weighting agent is selected from the group consisting of barium sulfate, calcium carbonate, dolomite, ilmenite, hematite, olivine, siderite, strontium sulfate, manganese oxide, and combinations thereof.

30. The method of claim 28, wherein the weighting agent is coated with a dispersant.

31. A method of gravel packing a wellbore in a subterranean formation, the wellbore comprising a cased section and an uncased section, the method comprising:
pumping into the wellbore a gravel pack composition comprising gravel and a carrier fluid, the carrier fluid comprising:
an oleaginous fluid; and
a weighting agent having a d50 less than 10 microns; and
wherein the carrier fluid has a fanning friction factor of less than 0.01, calculated by pumping a fluid sample through a tubing having an inner diameter of 0.305 inches at a specified flow rate in the range of 5-5.5 gpm, and by measuring a resulting pressure drop across a length of 16.25 feet of tubing.

32. The method of claim 31, wherein the weighting agent is selected from the group consisting of barium sulfate, calcium carbonate, dolomite, ilmenite, hematite, olivine, siderite, strontium sulfate, manganese oxide, and combinations thereof.

33. The method of claim 31, wherein the weighting agent is coated with a dispersant.

34. The method of claim 31, wherein the oleaginous fluid consists essentially of a base fluid selected from the group consisting, of diesel oil, mineral oil, white oil, n-alkanes, synthetic oil, saturated polyalpha olefins, unsaturated polyalpha olefins, and combinations thereof.

35. The method of claim 31, wherein the carrier fluid has a fanning friction factor of less than 0.007, calculated by pumping a fluid sample through a tubing having an inner diameter of 0.305 inches at a specified flow rate in the range of 5-5.5 gpm, and by measuring a resulting pressure drop across a length of 16.25 feet of tubing.

36. The method of claim 31, wherein the carrier fluid further comprises a friction reducer therein.

37. The method of claim 31, wherein the oleaginous fluid is an invert emulsion, wherein the invert emulsion comprises:
an oleaginous external phase;
a non-oleaginous internal phase; and
an emulsifier stabilizing the oleaginous external phase and the non-oleaginous internal phase.

* * * * *